C. R. FOSTER.
Rotary Gang-Plow.
No. 224,009.  Patented Feb. 3, 1880.
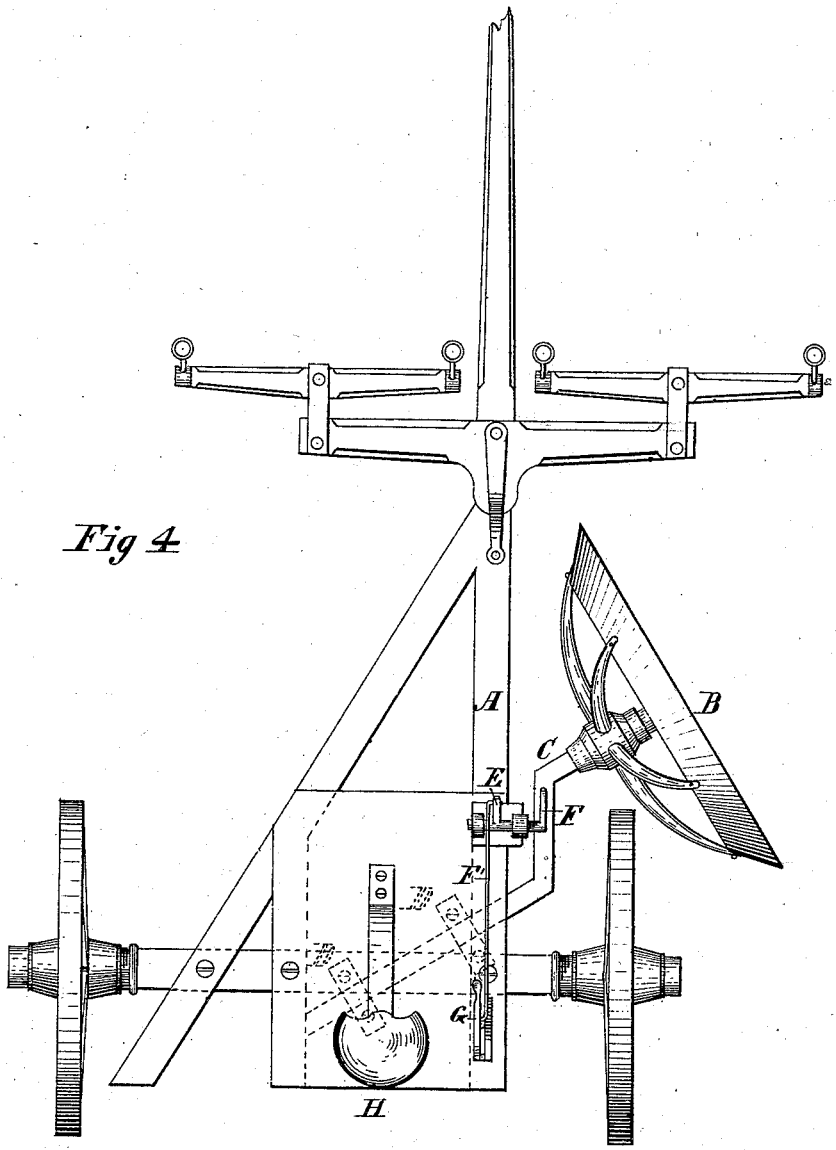

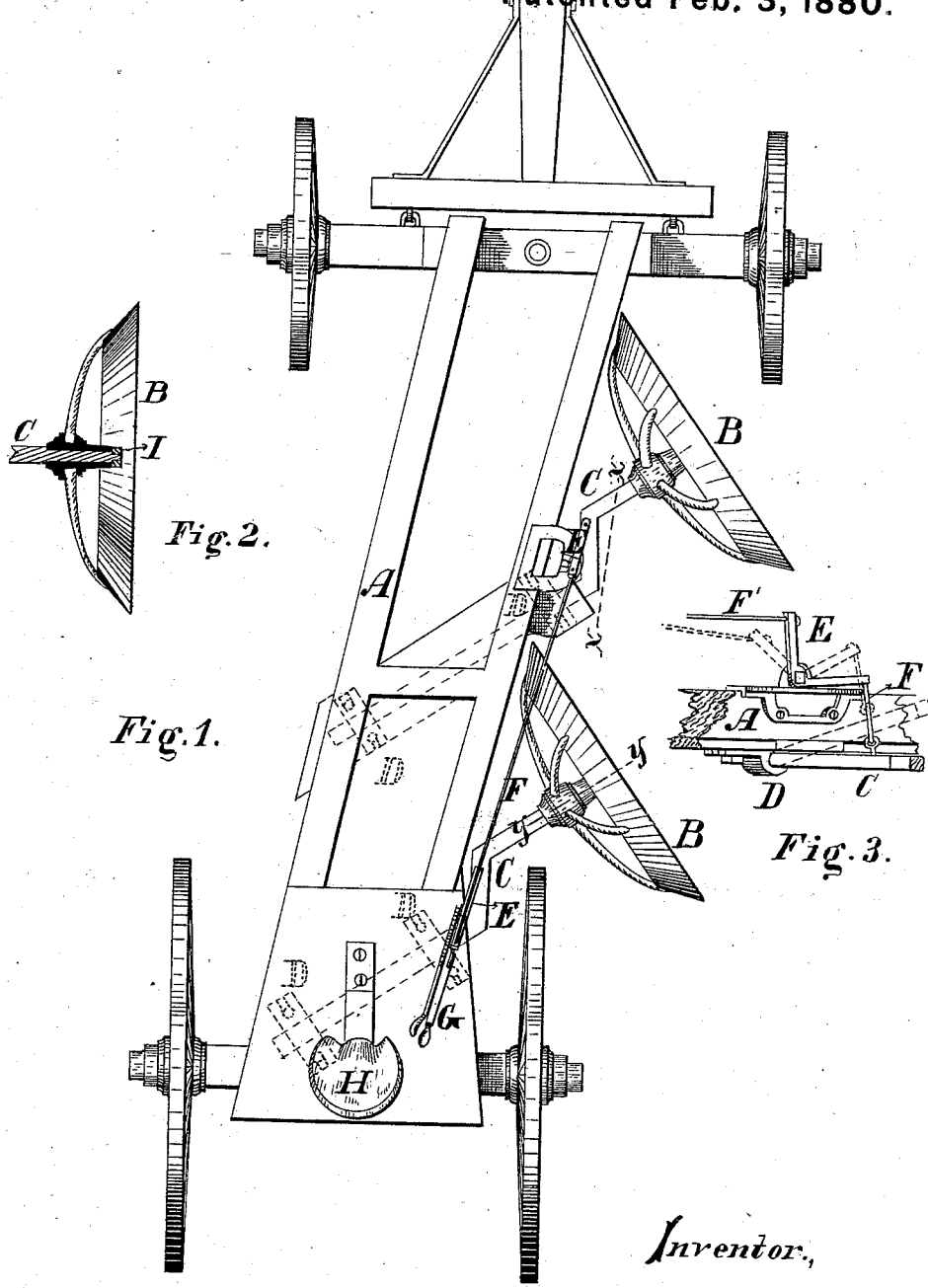

UNITED STATES PATENT OFFICE.

CHARLES R. FOSTER, OF CHICAGO, ILLINOIS.

ROTARY GANG-PLOW.

SPECIFICATION forming part of Letters Patent No. 224,009, dated February 3, 1880.

Application filed August 2, 1879.

*To all whom it may concern:*

Be it known that I, CHARLES R. FOSTER, of Chicago, in the county of Cook and State of Illinois, have invented a new and useful Improvement in Rotary Gang-Plows, which is fully described in the following specification, reference being had to the accompanying drawings, in which—

Figure 1 represents a top or plan view; Fig. 2, a sectional view of one of the rotary disk-plows, taken at the line *y y*, Fig. 1; Fig. 3, a side elevation of a detached section, taken at the dotted lines *x x*, Fig. 1; and Fig. 4, a plan view of a single-disk sulky-plow with my improvement.

The object of my invention is to overcome the difficulty of clogging, which has been experienced in the use of other disk-plows, and also so arrange them upon separate axles that they can be readily raised and lowered by the operator, and also changed so as to adjust their angle to the line of draft, as hereinafter fully described.

The invention consists in certain combinations of devices, all of which will be hereinafter more fully described, and pointed out definitely in the claims.

In the accompanying drawings, A represents the plow-frame, which is mounted on four wheels. B are the rotary disk-plows. The plows are hung upon crooked axles C, which have bearings D, attached to the frame A. Each plow is attached to the end of the axle, not unlike the manner of attaching a wagon-wheel to its axle. Each axle has two bearings on the frame A, and by moving the inside bearing, or the one most remote from the plow, turns the axle upon the other bearing, so as to change the line or angle of the face of the plow with the line of draft of the machine, and also vary the width of the cut or furrow of the plow.

E is a crank-lever attached to the frame A, and is provided with two rods, F and F', one of which, F, is attached to the axle of the plow, and the other, F', is attached to the lever G, placed upon the frame of the machine contiguous to the seat H, where the operator, sitting upon the seat, can conveniently raise and lower the plows by means of these rods and levers.

The frame A is mounted on four wheels, two of which run in furrows; but the rear wheels have to be set to one side of the front wheels the full distance cut by the plows, as one front wheel runs in the furrow ahead of the plows and one rear wheel in a furrow behind the plows.

The plow-frame A is placed at an angle to the line of draft, so that the rear wheels will follow in the same line of the front wheels, but be set over to land, and one of them follow in the furrow cut by the rear plow. The plows, being hung on the ends of the axles and on the outside of the frame A, will clear readily, and can be adjusted and controlled by the operator.

I is a nut on the end of the axle, by which the plow is secured thereon; but it can be readily removed for repairs.

I am aware that crank-axles bent at right angles, to which disks are attached, have been used in cultivators as a means, by their adjustment, of raising and lowering the disks, this being the only adjustment of which they are capable, all other necessary adjustments being effected by additional machinery; and I am also aware that in rotary plows obtusely-bent axles, to which disks are attached, have been used as a means, by their adjustment, of changing the angle of the disks to the line of draft, this being the only adjustment of which they are capable, the raising and lowering of the disks being effected by additional machinery. In distinction from these two classes of axles, the axle of my invention is capable, by its adjustment, of effecting both these results without the necessity for the employment of additional machinery to effect either purpose. The motion of my axle in one direction raises and lowers the disks. Its motion in another direction changes the angle of the disks to the line of draft, this being a distinctive feature of my invention.

Having thus fully described the construction and operation of my invention, what I claim, and desire to secure by Letters Patent, is—

1. The crank-axle C, having upon one end the disk-plow B, and mounted at the other end diagonally upon the wheeled supporting-frame A, in combination with the movable bearings D, the crank-lever E, hand-lever G, and link-rods connecting the lever and axle, whereby the axle is made capable of adjustment in two directions to either raise and lower the disks or change their angle to the line of draft, substantially as described.

2. The crank-axles C, mounted diagonally on the wheel-frame A, in combination with the disk-plows B, mounted on the axle-cranks outside of the supporting-frame, the crank-lever E, hand-lever G, and link-rods connecting the levers and axle, whereby the disks are raised and lowered, substantially as described.

CHARLES R. FOSTER.

Witnesses:
L. A. BUNTING,
JNO. C. MACGREGOR.